(12) United States Patent
Yang et al.

(10) Patent No.: US 8,967,076 B2
(45) Date of Patent: Mar. 3, 2015

(54) HYDROTHERMAL SYNTHESIS OF ACTIVE MATERIALS AND IN SITU SPRAYING DEPOSITION FOR LITHIUM ION BATTERY

(75) Inventors: Lu Yang, Santa Clara, CA (US);
Hooman Bolandi, San Jose, CA (US);
Karl Brown, Los Gatos, CA (US);
Victor Pebenito, San Jose, CA (US);
Donald Olgado, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 741 days.

(21) Appl. No.: 13/098,924

(22) Filed: May 2, 2011

(65) Prior Publication Data

US 2011/0274850 A1   Nov. 10, 2011

Related U.S. Application Data

(60) Provisional application No. 61/331,635, filed on May 5, 2010.

(51) Int. Cl.
*C23C 4/12* (2006.01)
*C23C 26/02* (2006.01)
*H01M 4/04* (2006.01)
*H01M 4/139* (2010.01)
*H01M 4/62* (2006.01)

(52) U.S. Cl.
CPC .............. *C23C 4/121* (2013.01); *C23C 26/02* (2013.01); *H01M 4/0419* (2013.01); *H01M 4/0421* (2013.01); *H01M 4/139* (2013.01); *H01M 4/625* (2013.01); *Y02E 60/122* (2013.01)

USPC   118/300; 118/620; 118/723 R; 118/723 MW

(58) Field of Classification Search
CPC ....................................... C23C 4/121
See application file for complete search history.

(56) References Cited

U.S. PATENT DOCUMENTS

| | | | | |
|---|---|---|---|---|
| 5,989,648 | A * | 11/1999 | Phillips | 427/456 |
| 6,652,822 | B2 * | 11/2003 | Phillips et al. | 423/290 |
| 2002/0192137 | A1 | 12/2002 | Chaloner-Gill et al. | |
| 2008/0241556 | A1 | 10/2008 | Akedo et al. | |
| 2011/0045107 | A1 | 2/2011 | Bedding et al. | |
| 2011/0045206 | A1 | 2/2011 | Shang et al. | |

FOREIGN PATENT DOCUMENTS

JP   2005-146406   6/2005

OTHER PUBLICATIONS

International Search Report and Written Opinion dated Feb. 8, 2012 for International Application No. PCT/US2011/033304.

(Continued)

*Primary Examiner* — Dah-Wei D Yuan
*Assistant Examiner* — Stephen Kitt
(74) *Attorney, Agent, or Firm* — Patterson & Sheridan, LLP

(57) ABSTRACT

A method and apparatus for forming an electrochemical layer of a lithium ion battery is provided. A precursor mixture in a carrying medium is activated in a reactor chamber by application of energy to synthesize active materials. The activated precursor mixture is then spray deposited on a substrate. A binder and conductive materials may be blended, or sprayed separately, with the nano- or micro-crystals as they deposit on the surface to enhance adhesion and conductivity.

18 Claims, 6 Drawing Sheets

(56) References Cited

OTHER PUBLICATIONS

A. Vadivel Murugan et al., One-Pot Microwave-Hydrothermal Synthesis and Characterization of Carbon-Coated LiMPO$_4$ (M=Mn, Fe, and Co) Cathodes, J. Electrochemical Society, 2009, vol. 156(2), pp. A79-A83.

A. Vadivel Murugan et al., Rapid microwave-solvothermal synthesis of phospho-olivine nanorods and their coating with a mixed conducting polymer for lithium ion batteries, Electrochemistry Communications, 2008, vol. 10, pp. 903-906.

Sun et al., AlF3-Coating to Improve High Voltage Cycling Performance of Li[Ni1/3Co1/3Mn1/3]O2 Cathode Materials for Lithium Secondary Batteries, J. electrochemical society, 2007, vol. 154(3), pp. A168-A172.

* cited by examiner

HYDROTHERMAL SYNTHESIS OF ACTIVE MATERIALS AND IN SITU SPRAYING DEPOSITION FOR LITHIUM ION BATTERY

CROSS-REFERENCE TO RELATED APPLICATIONS

This application claims benefit of U.S. provisional patent application Ser. No. 61/331,635, filed May 5, 2010, which is herein incorporated by reference in its entirety.

BACKGROUND OF THE INVENTION

1. Field of the Invention

Embodiments of the present invention relate generally to lithium-ion batteries, and more specifically, to a method of fabricating such batteries using thin-film deposition processes.

2. Description of the Related Art

Fast-charging, high-capacity energy storage devices, such as supercapacitors and lithium (Li) ion batteries, are used in a growing number of applications, including portable electronics, medical devices, transportation, grid-connected large energy storage, renewable energy storage, and uninterruptible power supplies (UPS). In modern rechargeable energy storage devices, the current collector is made of an electric conductor. Examples of materials for the positive current collector (the cathode) include aluminum, stainless steel, and nickel. Such collectors can be in the form of a foil, a film, or a thin plate, having a thickness that generally ranges from about 6 to 50 µm.

The active electrode material in the positive electrode of a Li-ion battery is typically selected from lithium transition metal oxides, such as $LiFePO_4$, $LiMn_2O_4$, $LiCoO_2$, $LiNiO_2$, or combinations of Li, Ni, Mn, and Co oxides and includes electroconductive particles, such as carbon black or graphite, and a binder material. Such positive electrode material is considered to be a lithium-intercalation compound, in which the quantity of conductive material is in the range from 0.1% to 15% by weight.

The active materials are dispersed in a polymeric binder matrix and then applied to the current collector. The polymers for the binder matrix are made of thermoplastic polymers including polymers with rubber elasticity. The polymeric binder serves to bind together the cathode active materials to preclude crack formation and prevent disintegration of the active materials on the surface of the current collector. The quantity of polymeric binder is in the range of 0.5% to 30% by weight.

Current manufacturing techniques for forming cathodes are both energy and time consuming. The synthesis of active material in present methods requires high temperature and harsh reaction conditions. Synthesis of the active material may also take several hours to several days to complete. Once synthesis of the active material is complete, the active material is combined with conductive additives, binders, and toxic and expensive solvents to make a slurry. The slurry is then deposited onto the positive current collector. The slurry coated on the current collector needs to go through a long and energy intensive drying process. Drying lines created to complete the drying of the slurry can be quite long depending on the output of the synthesis and deposition processes.

Accordingly, there is a need in the art for systems and methods which can quickly and more energy efficiently produce cathodes for energy storage devices.

SUMMARY OF THE INVENTION

In one embodiment, an apparatus for continuously forming an electrochemical film on a substrate is disclosed. The apparatus generally includes at least one precursor supply, a reaction chamber, and a spray chamber. The reaction chamber generally includes a chamber tube having an inlet fluidly coupled to the at least one precursor supply, an energy applicator positioned to operatively energize precursors in the chamber tube, and an energy source coupled to the energy applicator. The spray chamber is fluidly coupled to an outlet of the chamber tube.

In another embodiment, a method of continuously forming a layer on a substrate is disclosed. The method generally includes flowing one or more precursors into a reactor chamber continuously, coupling energy with the one or more precursors continuously to form crystals of active material, continuously passing a substrate through a spray chamber, and spraying the active material continuously into the spray chamber to deposit a layer of the active material onto the substrate.

BRIEF DESCRIPTION OF THE DRAWINGS

So that the manner in which the above-recited features of the present inventions can be understood in detail, a more particular description of the inventions, briefly summarized above, may be had by reference to embodiments, some of which are illustrated in the appended drawings. It is to be noted, however, that the appended drawings illustrate only typical embodiments of these inventions and are therefore not to be considered limiting of its scope, for the inventions may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein generally provide methods and apparatus for continuously forming a film on a substrate. In one embodiment, the film may be an electrochemical film for a thin-film battery, such as a Li-ion battery. Other applications include fuel cell manufacturing, semiconductor manufacturing, and solar cell manufacturing. A precursor or mixture of precursors of specific compounds is provided to a reactor chamber where energy is applied to carry out reactions. The specific compounds, when reacted, become an electrochemically active material. The precursors may be particles suspended in a carrier medium or dissolved solutions. The active material synthesis produces nano- or microcrystals, which may then be sprayed to form a layer or film on the substrate surface.

Figure 1:
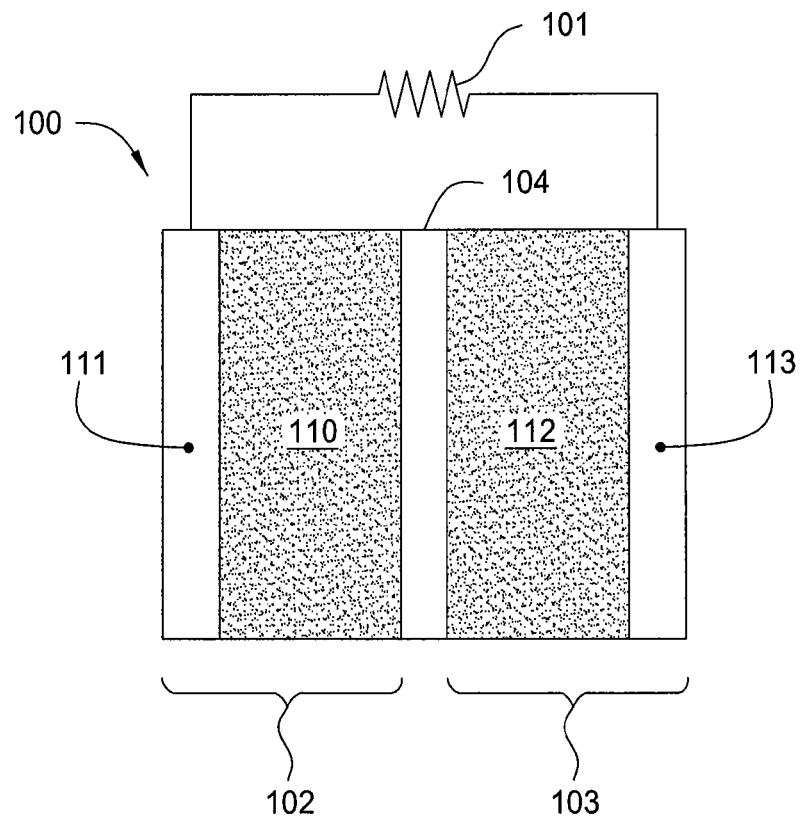
FIG. 1 is a schematic diagram of a Li-ion battery according to one embodiment.

FIG. 1 is a schematic diagram of a Li-ion battery 100 electrically connected to a load 101, according to an embodiment of the invention. The primary functional components of the Li-ion battery 100 include an anode structure 102, a cathode structure 103, a fluid permeable separator layer 104, and an electrolyte (not shown) disposed within the region between opposing current collectors 111 and 113. A variety of materials may be used as the electrolyte, such as a lithium salt in an organic solvent. The electrolyte is contained in the anode structure 102, the cathode structure 103, and the separator layer 104 in the region defined between the current collectors 111 and 113.

The anode structure 102 and the cathode structure 103 each serve as a half-cell of the Li-ion battery 100 and together form a complete working cell of the Li-ion battery 100. The anode structure 102 includes the current collector 111, or negative electrode, and a material layer 110, such as a carbon-based intercalation host material for hosting lithium ions. Similarly, the cathode structure 103 includes the current collector 113, or positive electrode, and a second material layer 112, such as a metal oxide, consisting of an electrochemically active material combined with other conductive materials which are suspended in a binder. The material layer 112 may also be a host for lithium ions since lithium ions may pass from the anode structure 102 to the cathode structure 103 during discharging of the Li-ion battery 100. The current collectors 111 and 113 are made of electrically conductive material, such as a metal. The separator layer 104, which is electron insulating, porous, and fluid-permeable, is used to prevent direct electrical contact between the components in the anode structure 102 and the cathode structure 103.

The electrochemically active material of the material layer 112 in the cathode structure 103 may be made from layered oxides, such as lithium cobalt oxide, an olivine, such as lithium iron phosphate, or a spinel, such as lithium manganese oxide, or a mixture thereof. In non-lithium embodiments, an exemplary cathode may be made from $TiS_2$ (titanium disulfide). Exemplary lithium-containing oxides may be layered lithium cobalt oxide, or a mixed metal oxide, such as $LiNi_xCO_{1-2x}MnO_2$, where x is in a range between 0 and 0.5, or a spinel such as $LiMn_2O_4$. Other exemplary mixed metal oxides are $LiNi_{0.8}CO_{0.15}Al_{0.05}O_2$ and $LiNi_xMn_yCO_zO_2$, where x, y, and z are between 0 and 1. Exemplary phosphates may be iron olivine ($LiFePO_4$) and its variants (such as $LiFe_{1-x}MgPO_4$, where x is in a range between 0 and 1), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$. Exemplary fluorophosphates may be $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Exemplary silicates may be $Li_2FeSiO_4$, $Li_2MnSiO_4$, or $Li_2VOSiO_4$. An exemplary non-lithium compound is $Na_5V_2(PO_4)_2F_3$.

The material layer 110 in the anode structure 102 may be made from graphitic microbeads dispersed in a polymer matrix. Additionally, microbeads or alloys of silicon, tin, or lithium titanate ($Li_4Ti_5O_{12}$) may be used with, or instead of, graphitic microbeads to provide the conductive core anode material.

Figure 2:
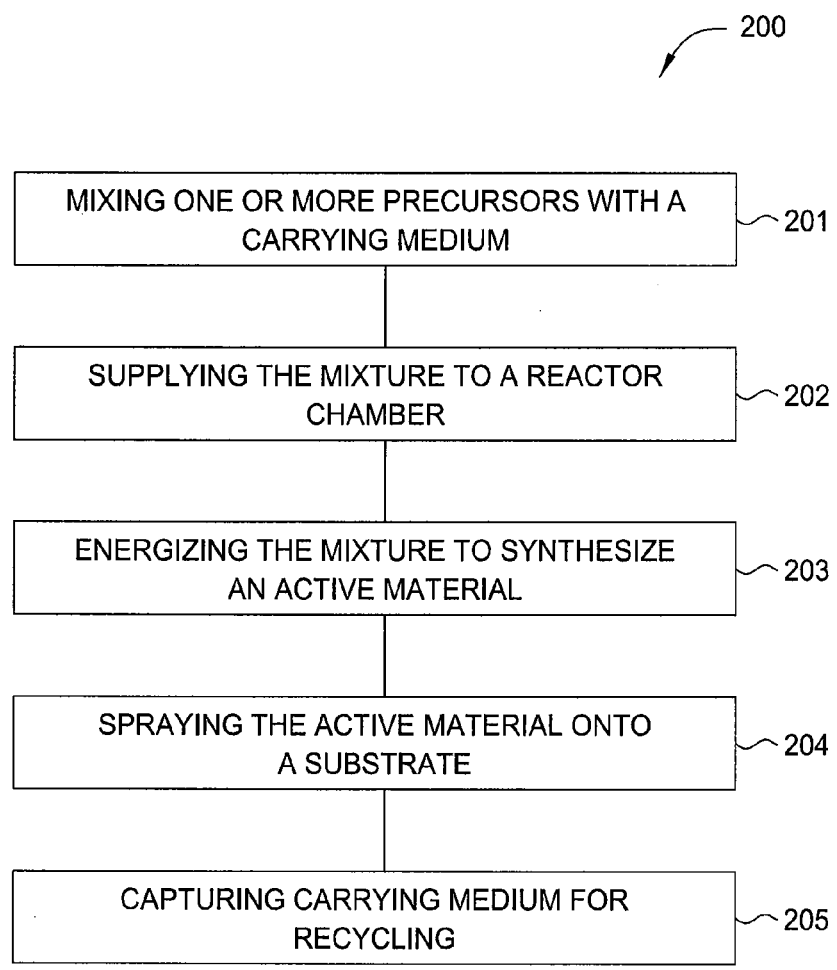
FIG. 2 is a flow diagram summarizing a method of forming a film according to one embodiment.

FIG. 2 is a flow diagram summarizing a method 200 of forming a film according to one embodiment. The method 200 is useful for forming a film, or layer, of an electrochemical agent, such as the electrolyte containing materials, cathode materials, and/or anode materials described above, on a substrate. The substrate may have a surface that comprises a conductive current collector material for a battery structure, as described above with respect to FIG. 1. For example, the substrate may have a copper or aluminum electrode surface. The method 200 begins at box 201 where one or more precursors, supplied as a solution or gel, are mixed with a carrying medium. The one or more precursors may consist of, but are not limited to, LiOH, $FeSO_4$, $H_3PO_4$, $Ni(NO_3)_2$, $Co(NO_3)_2$, and $AlCl_3$. The carrying medium may be water mixed with a salt, an organic solvent, such as for example alcohols, or hydrocarbons, mixed with a salt, or a combination thereof. The carrying medium may also include carbon-containing materials, such as sugars. The carrying medium may alternatively be a gas such as helium, argon, or nitrogen.

Figure 3A:
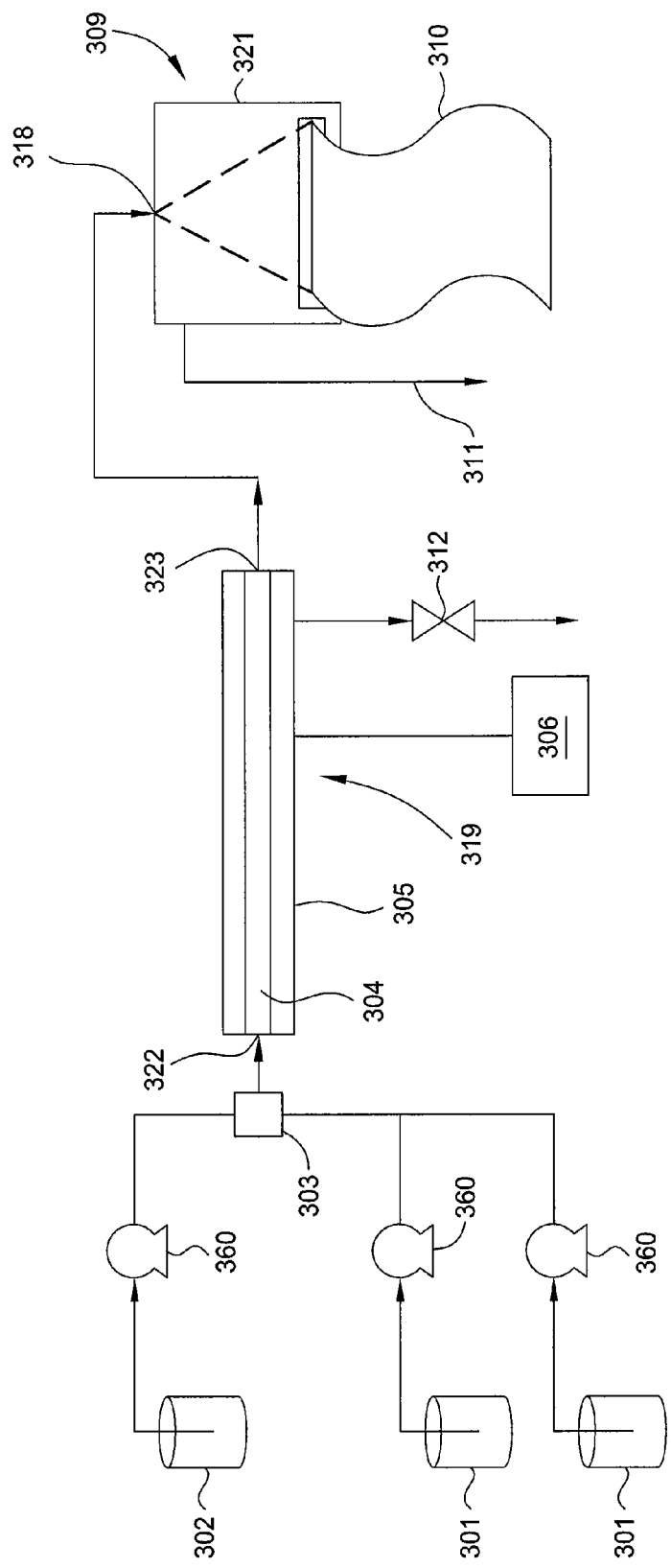
FIG. 3A is a schematic view of a film formation apparatus according to one embodiment.

Referring additionally to FIG. 3A, one or more precursors may be pumped from precursor supplies 301 to a mixer 303. The precursor or precursors may be pumped from the precursor supplies by one of the pumps 360. A carrying medium may be pumped from a carrying medium supply 302 to the mixer 303, for example by one of the pumps 360, where it may then be mixed with the precursor or precursors from the precursor supplies 301. The mixer 303 may be one of an ultrasonic static mixer or stirring mixer. In an alternative embodiment, the precursors may already be held in a carrying medium in precursor supplies 301, and would thus not require mixing by the mixer 303. Upon exiting the mixer 303 the mixture of precursors and carrying mediums may be a liquid solution or comprise particles dispersed within the carrying medium. The particles generally include the components used to form the electrochemically active materials, or cathode materials, described above.

The precursor and carrying medium mixture, hereafter "slurry", is supplied from the mixer 303 to a reaction chamber 319 at box 202 of the method 200. The reaction chamber 319 may include a chamber tube 304, having an inlet 322 and an outlet 323, surrounded by an energy applicator 305, as seen in FIG. 3A. The chamber tube 304 may be constructed of, for example, a fluoropolymer, such as polytetrafluoroethylene (PTFE), quartz, or a tube of different microwave and/or RF transparent material coated in a fluoropolymer or quartz to protect against corrosion.

At box 203 of the method 200, the slurry is energized to synthesize an active material. The energy excites thermal motion of atoms in the particles dispersed in the slurry causing them to move to preferentially find lower energy crystal lattice positions. The active material may be, but is not limited to, any of the active materials for the material layers 110, 112 listed above. Energy source 306 supplies energy to the energy applicator 305 which evenly distributes the energy across the chamber tube 304. The supplied energy may be microwave energy, ultrasonic energy, DC voltage, RF energy, or combinations thereof. The energy may be applied in two phases. For example, RF energy may be applied in a first phase, and then microwave energy may be applied in a second phase. The energy may be applied through a combination of means, such as electrical and thermal means. Conditions within the chamber tube 304 during energization of the slurry may need to be varied. A regulator valve 312 may be utilized to maintain the pressure within the chamber tube 304 between a range of 10 bar and 100 bar, for example, between 20 bar and 80 bar, to prevent damage to the chamber tube 304 due to expansion of the slurry while heating.

Particles of active material may be synthesized at box 203 of the method 200 to be of a controlled size and morphology. The size and morphology of the active particles may be controlled by controlling at least on of the slurry flow rate into the chamber tube 304, the pressure inside the chamber tube 304, the amount of energy provided by the energy source 306 to the slurry, or other variables, such as carbon content in the slurry, for example. The precursor combination or concentration of each precursor and the carrying medium may also be varied to achieve different targets in size of the particles or composition of the active material. Slurry passing through the chamber tube 304 may be energized continuously so as to provide a continuous production of activate material for use in the method 200. The particles of active material, which may be nano- or micro-particles or crystals, may have a flake or needle shape, and have a size between about 10 nm and 20000 nm, for example between about 75 nm and 750 nm, or between about 90 nm and 500 nm. The particles of active material may optionally have a [020] crystal surface texture. The particles of active material may also have a conductive coating, such as a carbon coating, upon exiting the chamber tube 304. The carbon coating may be between 1 nm and 25 nm thick, such as for example between 5 nm and 10 nm thick. The active material synthesized may be one of the exemplary electrolyte containing materials described above.

Figure 3B:
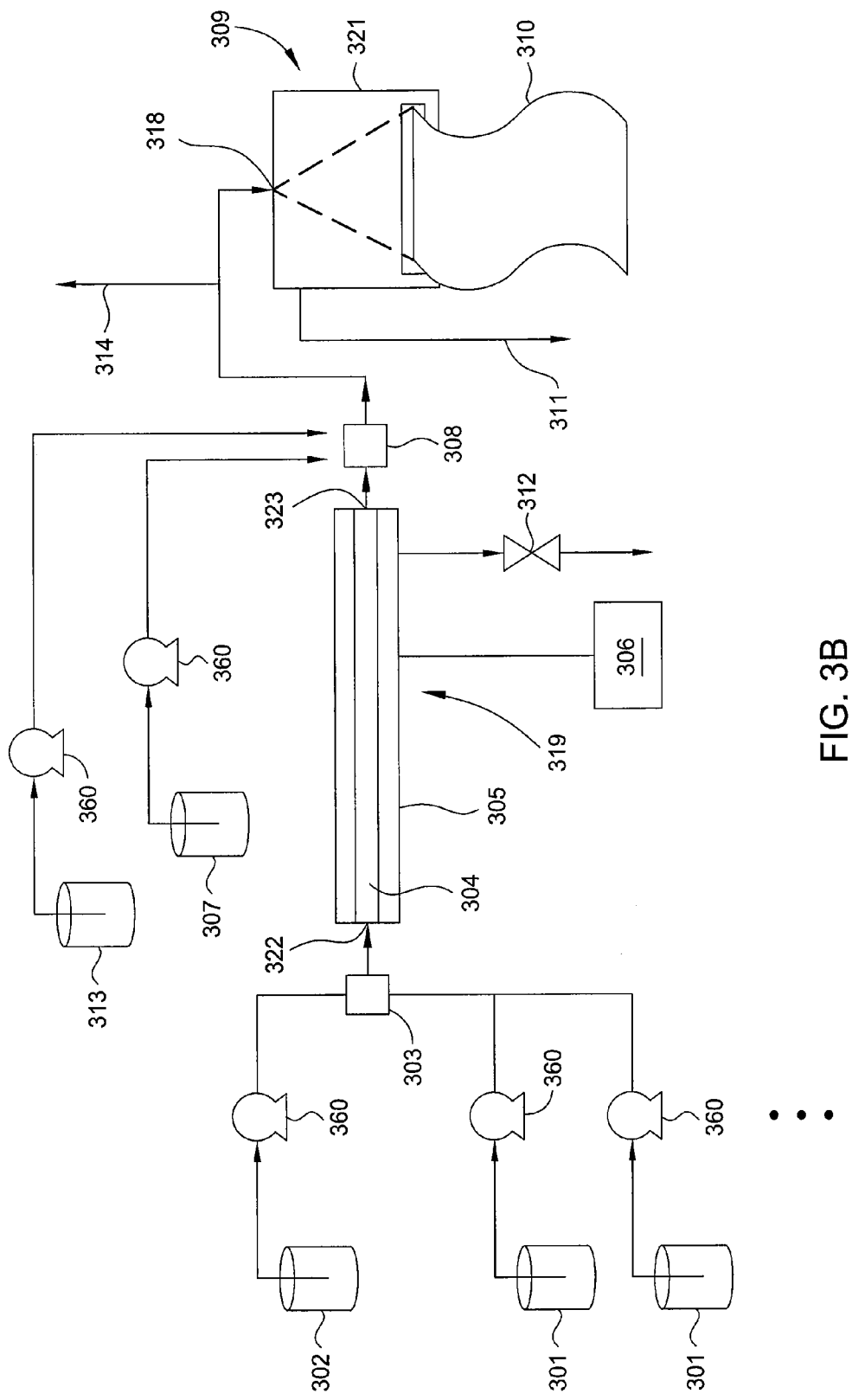
FIG. 3B is a schematic view of a film formation apparatus according to another embodiment.

In one embodiment, an optional binding agent may be supplied from a binder supply 307 to a mixer 308, for example by one of the pumps 360, where the binding agent is mixed with the active material mixture exiting the chamber tube 304, as seen in FIG. 3B. The binder material may be a polymer, polymer mixture or monomers. Optionally, a carbon source, such as, for example, sugar in solution, may be provided from a carbon source supply 313 to the mixer 308, for example by one of the pumps 360, and mixed into the active material mixture. Byproducts created during the active material synthesis reaction may be optionally filtered out and removed through exhaust conduit 314. The presence of byproducts depends on the carrying medium and precursors used, but may include, for example, $Li_2SO_4$.

At box 204 of the method 200, the active material may be sprayed toward a substrate 310 to form a layer of the active materials thereon. If a binder material is used, the active material and binder are both deposited onto the substrate, and the binder material is evenly distributed within the active material. The substrate 310 may consist of a sheet or roll of current collecting material, such as for example copper or aluminum. The substrate 310 may also have raised structures, such as a mesh, to enhance the interface between the active materials and the substrate 310. The substrate 310 may be transported through a spray chamber 309 and under a spray nozzle 318 on rollers (not shown). The substrate 310 may be on a roll (not shown) and may be placed on another roll (not shown) after passing through the spray chamber. The spray nozzle 318 may be attached to an upper portion of a chamber body 321 of the spray chamber 309. In one embodiment, the spraying method employed is that of a plasma spray, such as a DC plasma spray or an RF inductive plasma spray, where the material is carried by a jet of plasma toward the substrate and deposited.

During the spray process, the added carbon-containing material may be bonded to the crystals of active material and form a thin carbon layer. The thin carbon layer may assist in creating a conductive connection to the substrate 310 and may be between 5 nm and 10 nm thick. The crystals of active material may also be at least partially coated in a thin carbon layer after exiting the reaction chamber 319 if a carbon-containing compound is added to the carrying medium. The layer of active material deposited onto the substrate 310 may contain crystals of active material where each crystal of active material coated in a thin carbon film. The crystals may be in contact with each other and at least a portion of the crystals, and the thin carbon film, are in contact with the substrate 310. The layer of active material may also contain a binder material distributed between the active material crystals to bind the crystals of active material together and to bind the layer of active material to the substrate. The binder material may be distributed in such a way as to allow contact between the crystals of active material and to allow contact of the crystals of active material with the substrate 310.

The carrying medium in the active material mixture may be a liquid that is atomized upon entering the spray chamber 309. The carrying medium may also be selected to nucleate around the active material particles to reduce attachment to the walls of the spray chamber 309. The substrate 310 may optionally pass through the spray chamber 309 a second time to coat the opposite side of the substrate 310 with the active materials.

The spray nozzle 318 may consist of one or more spray nozzles arranged in an array. The array may be configured to effectively cover a width of the passing substrate 310 by placing multiple nozzles side by side in a direction perpendicular to the direction of travel of the substrate 310. It may be beneficial to build multiple or thicker layers of active material onto the substrate 310. The spray nozzle 318 may consist of one or more nozzles positioned one behind the other in a direction parallel to the direction of travel of the substrate 310 in order to deposit a thicker layer of the active materials. The rate at which the substrate 310 travels through the spray chamber 309 may also be varied to alter the thickness of the active material layer being deposited onto the substrate 310. In another embodiment, a second spray nozzle (not shown) or nozzle array may be positioned within the spray chamber 309 and underneath the substrate 310 in order to spray the bottom of the substrate 310.

Figure 3C:
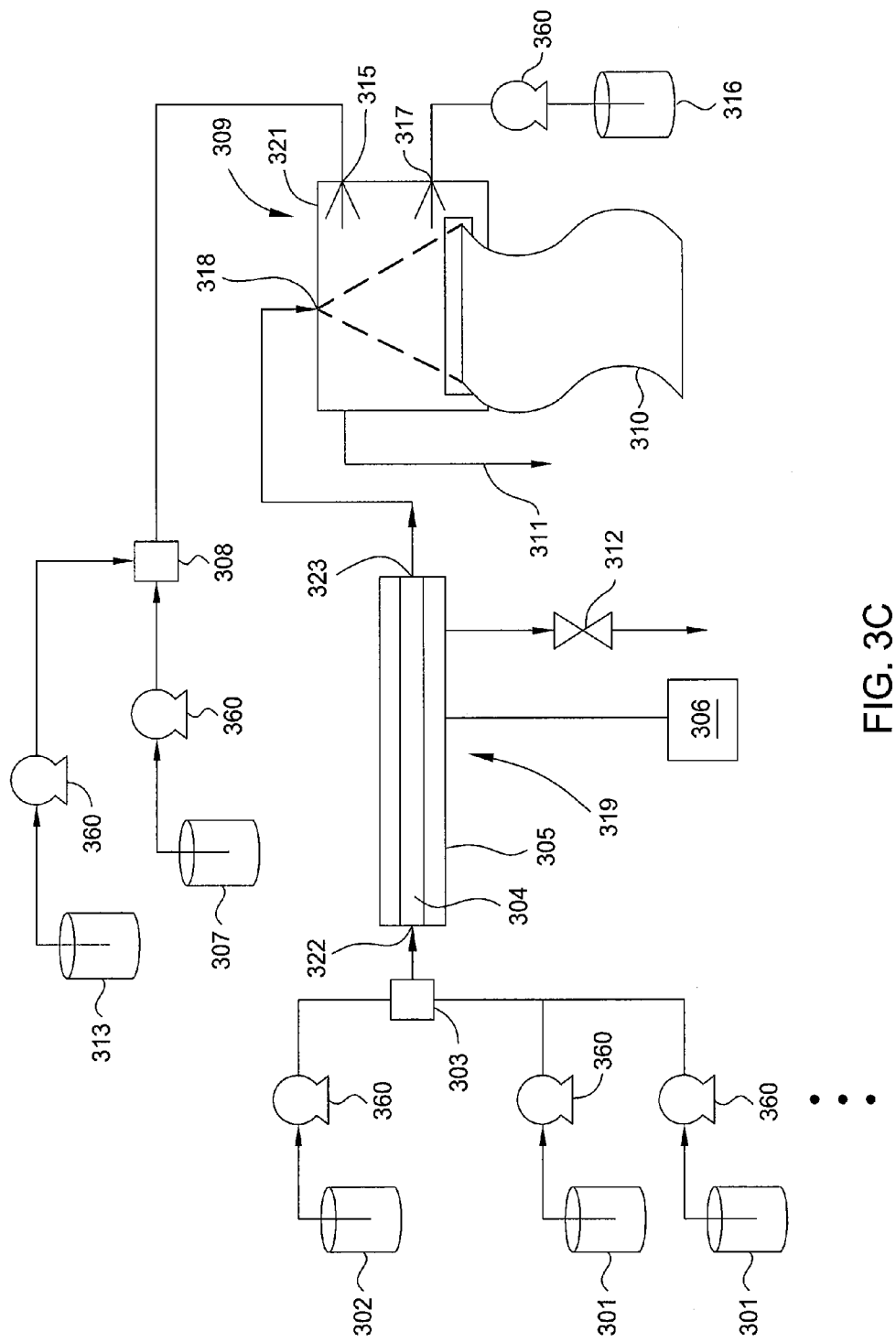
FIG. 3C is a schematic view of a film formation apparatus according to another embodiment.
Figure 3D:
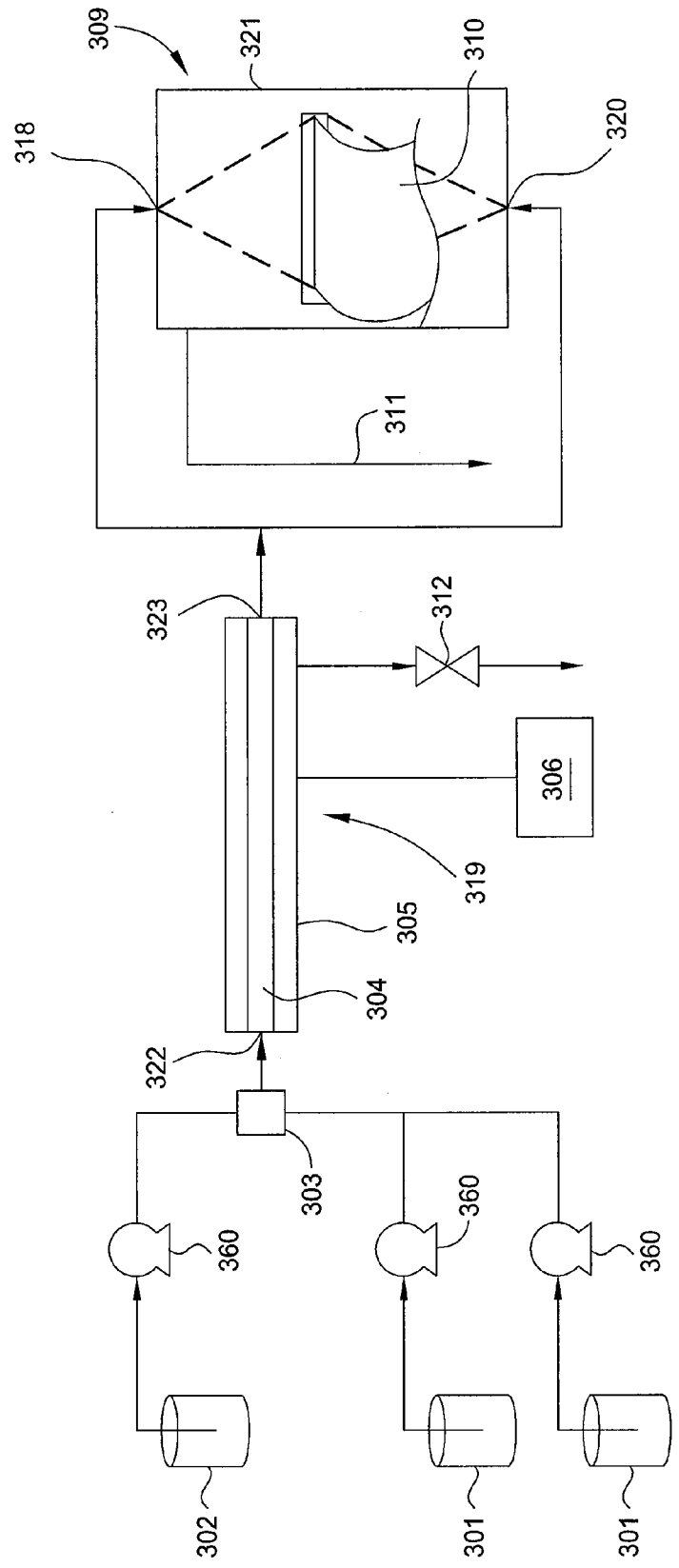
FIG. 3D is a schematic view of a film formation apparatus according to another embodiment.

The use of a second spray nozzle 320, in combination with the spray nozzle 318, may allow for simultaneous spraying of the top and bottom of the substrate as it passes through the spray chamber 309, as seen in FIG. 3D. The substrate 310 could also be vertically oriented and spray nozzles may be arranged to spray from both sides of the substrate 310.

The active material mixture may be sprayed at a rate between 1 ml/min and 5000 ml/min, such as for example between 1 ml/min and 15 ml/min, or between about 2 ml/min and 10 ml/min, from spray nozzle 318 or each spray nozzle in the array of spray nozzles. The conditions within the spray chamber may be controlled such that the pressure within the chamber is between 1 Torr and 125 Torr, such as for example between 5 Torr and 100 Torr, and the temperature is between 100° C. and 1500° C., such as for example between 200° C. and 1000° C.

Optionally, as seen in FIG. 3C, a binding material and carbon containing material may be sprayed, by way of a nozzle 315, into the spray chamber 309, while the active material is being sprayed from the nozzle 318. Providing the binding material through a separate spray nozzle 315 may be beneficial so as to not clog the spray nozzle 318. A quenching gas, such as nitrogen or other inert gas, may be pumped from quenching gas supply 316, for example by one of the pumps 360, into the spray chamber 309, by way of nozzle 317. The gas may be supplied at a controlled rate in order to control the rate of temperature change of the active material, thus annealing the recently deposited active material to a desired amount of annealing. The annealing process may be beneficial to solidify the grain structure and size of the active material particles. Heated rollers or a radiant heater (not shown) may be positioned beneath the substrate 310 within the spray chamber 309 in order to ensure even heating of the active material deposited on the substrate 310. At box 205 of the method 200, carrying solvents used throughout the method 200 may be collected and exhausted from the spray camber 309 through exhaust conduit 311 to be recycled.

The active material synthesis methods described effectively and efficiently produce active materials for the creation of energy storage devices.

While the foregoing is directed to embodiments of the present invention, other and further embodiments of the invention may be devised without departing from the basic scope thereof, and the scope thereof is determined by the claims that follow.

What is claimed is:

1. An apparatus for continuously forming an electrochemical film on a substrate, comprising:
 at least one precursor supply;
 a reaction chamber, comprising:
  a chamber tube having an inlet fluidly coupled to the at least one precursor supply;
  an energy applicator positioned to operatively energize precursors in the chamber tube; and
  an energy source coupled to the energy applicator; and
 a spray chamber fluidly coupled to an outlet of the chamber tube, wherein the spray chamber comprises:
  a chamber body;
  at least one spray nozzle fluidly coupled to the outlet of the chamber tube; and
  a continuous substrate transporting device for passing the substrate through the chamber body; and
  a quenching gas supply fluidly coupled to the spray chamber.

2. The apparatus of claim 1, wherein the chamber tube comprises a tube made of polytetrafluoroethylene or quartz.

3. The apparatus of claim 1, wherein the chamber tube comprises a tube of microwave transparent material coated in a polytetrafluoroethylene or quartz.

4. The apparatus of claim 1, wherein the energy source produces at least one of microwave energy, ultrasonic energy, DC voltage, and RF energy, and wherein the energy applicator surrounds the chamber tube.

5. The apparatus of claim 1, wherein the at least one spray nozzle is a DC plasma spray nozzle or a RF inductive plasma spray nozzle.

6. The apparatus of claim 1, further comprising:
 a carrying medium supply; and
 a mixer fluidly coupled to the at least one precursor supply, the carrying medium supply, and the inlet of the chamber tube.

7. The apparatus of claim 1, further comprising an exhaust conduit fluidly coupled to the outlet of the chamber tube to provide a path for removing byproducts from fluid exiting the chamber tube prior to entering the spray chamber.

8. The apparatus of claim 1, further comprising:
 a binder supply; and
 a mixer, wherein the mixer is fluidly coupled to the binder supply, the outlet of the chamber tube, and the spray chamber.

9. The apparatus of claim 1, further comprising:
 a carbon source supply; and
  a mixer, wherein the mixer is fluidly coupled to the carbon source supply, the outlet of the chamber tube, and the spray chamber.

10. The apparatus of claim 1, wherein the continuous substrate transporting device comprises rollers.

11. The apparatus of claim 10, wherein the rollers are heated.

12. The apparatus of claim 1, wherein the spray chamber further comprises a heater.

13. The apparatus of claim 1, wherein the continuous substrate transporting device comprises a first and a second roll, wherein the substrate passes from the first roll to the second roll through the chamber body.

14. The apparatus of claim 1, wherein the substrate is vertically orientated in the spray chamber.

15. An apparatus for continuously forming an electrochemical film on a substrate, comprising:
 at least one precursor supply;
 a reaction chamber, comprising:
  a chamber tube having an inlet fluidly coupled to the at least one precursor supply;
  an energy applicator positioned to operatively energize precursors in the chamber tube; and
  an energy source coupled to the energy applicator;
 a spray chamber fluidly coupled to an outlet of the chamber tube; and
 a conduit coupled between the reaction chamber and the spray chamber, wherein the spray chamber comprises:
  a chamber body;
  at least one spray nozzle fluidly coupled to the outlet of the chamber tube; and
  a continuous substrate transporting device for passing the substrate through the chamber body; and
  a quenching gas supply fluidly coupled to the spray chamber.

16. An apparatus for continuously forming an electrochemical film on a substrate, comprising:
 at least one precursor supply;
 a reaction chamber, comprising:
  a chamber tube having an inlet fluidly coupled to the at least one precursor supply;
  an energy applicator positioned to operatively energize precursors in the chamber tube; and
  an energy source coupled to the energy applicator;
 a mixer coupled between the at least one precursor supply and the reaction chamber, wherein the mixer comprises an ultrasonic static mixer or a stirring mixer; and
 a spray chamber fluidly coupled to an outlet of the chamber tube, wherein the spray chamber comprises:
  a chamber body;
  at least one spray nozzle fluidly coupled to the outlet of the chamber tube; and
  a continuous substrate transporting device for passing the substrate through the chamber body; and
  a quenching gas supply fluidly coupled to the spray chamber.

17. The apparatus of claim 16, further comprising a first conduit coupled between the at least one precursor supply and the mixer.

18. The apparatus of claim 16, further comprising a second conduit coupled between the mixer and the reaction chamber.

* * * * *